(12) United States Patent  
Sun et al.

(10) Patent No.: US 11,088,651 B2  
(45) Date of Patent: Aug. 10, 2021

(54) REFRIGERANT COMPRESSOR ARRANGEMENTS

(71) Applicant: Danfoss A/S, Nordborg (DK)

(72) Inventors: Lin Sun, Tallahassee, FL (US); HuaiYu Lin, Tallahassee, FL (US)

(73) Assignee: Danfoss A/S

( * ) Notice: Subject to any disclaimer, the term of this patent is extended or adjusted under 35 U.S.C. 154(b) by 415 days.

(21) Appl. No.: 16/308,878

(22) PCT Filed: Mar. 6, 2017

(86) PCT No.: PCT/US2017/020953  
§ 371 (c)(1),  
(2) Date: Dec. 11, 2018

(87) PCT Pub. No.: WO2018/031071  
PCT Pub. Date: Feb. 15, 2018

(65) Prior Publication Data  
US 2020/0313599 A1 Oct. 1, 2020

Related U.S. Application Data

(60) Provisional application No. 62/374,193, filed on Aug. 12, 2016.

(51) Int. Cl.
| | |
|---|---|
| F25B 49/02 | (2006.01) |
| H02P 29/50 | (2016.01) |
| F04B 49/20 | (2006.01) |
| F25B 31/02 | (2006.01) |
| H02P 25/22 | (2006.01) |

(Continued)

(52) U.S. Cl.  
CPC .............. H02P 29/50 (2016.02); F04B 49/20 (2013.01); F25B 31/02 (2013.01); H02P 25/22 (2013.01); H02P 27/06 (2013.01); F25B 1/10 (2013.01); F25B 2400/06 (2013.01)

(58) Field of Classification Search  
CPC ........ F04B 49/20; F25B 1/10; F25B 2400/06; F25B 2400/075; F25B 2600/021; F25B 31/02; F25B 49/025; H02J 3/01; H02M 5/458; H02M 5/4585; H02P 25/22; H02P 27/06; H02P 29/50; H02P 5/74  
See application file for complete search history.

(56) References Cited

U.S. PATENT DOCUMENTS

| | | | |
|---|---|---|---|
| 2010/0125371 A1* | 5/2010 | Judge | .................... F25B 49/025 700/282 |
| 2014/0146584 A1 | 5/2014 | Swamy | |

(Continued)

OTHER PUBLICATIONS

Skibinski, Gary L. et al., Cost Effective Multi-Pulse Transformer Solutions For Harmonic Mitigation in AC Drives, IEEE Industry Application Society (IAS) Conference, 2003, pp. 1-10.

(Continued)

*Primary Examiner* — Muhammad S Islam  
(74) *Attorney, Agent, or Firm* — Carlson, Gaskey & Olds, P.C.

(57) ABSTRACT

Compressors in a refrigerant loop are driven by variable frequency drives. The variable frequency drives are configured to demand current from an alternating current power source at different phases relative to one another such that at least one current harmonic frequency at the alternating current power source is cancelled.

4 Claims, 13 Drawing Sheets

(51) Int. Cl.
*H02P 27/06* (2006.01)
*F25B 1/10* (2006.01)

(56) References Cited

U.S. PATENT DOCUMENTS

2015/0330693 A1* 11/2015 Sykora ............... B60H 1/00428
                                                            62/115
2016/0006379 A1*  1/2016 Wang ....................... H02P 5/74
                                                              318/5

OTHER PUBLICATIONS

International Search Report and Written Opinion for International Application No. PCT/US2017/020953 dated Jul. 14, 2017.
International Perliminary Report on Patentability for International Application No. PCT/US2017/020953 dated Feb. 21, 2019.

* cited by examiner

FIG.1

| | THD | 5th | 7th | 11th | 13th | 17th | 19th | 23rd | 25th | 29th | 31st | 35th | 37th |
|---|---|---|---|---|---|---|---|---|---|---|---|---|---|
| 6 PULSE | 30–45% | X | X | X | X | X | X | X | X | X | X | X | X |
| 12 PULSE | 10–15% | | | X | X | | | X | X | | | X | X |
| 18 PULSE | 5–6% | | | | | X | X | | | | | X | X |

REFRIGERANT COMPRESSOR ARRANGEMENTS

RELATED APPLICATIONS

This application claims the benefit of U.S. Provisional Application No. 62/374,193, filed Aug. 12, 2016, the entirety of which is herein incorporated by reference.

BACKGROUND

Refrigerant compressors are used to circulate refrigerant in a chiller via a refrigerant loop. Refrigerant loops are known to include a condenser, an expansion device, and an evaporator. In many chillers, refrigerant compressors have motors connected to variable frequency drives (VFDs). Variable frequency drives use rectifiers to convert incoming alternating current power to direct current power. The direct current power is then converted back into alternating current power by an inverter and driven to a motor at a speed/frequency required by the application. A VFD is a non-linear load for the power source, which creates harmonic distortion at the source. Harmonics are known to create several problems in electrical systems, including losses, poor power factor, excessive heating, early component failure, and communications interference.

A common rectifier for use in variable frequency drives has an arrangement of six diodes. Variable frequency drives having one such rectifier are commonly called "six pulse variable frequency drives." To mitigate harmonic distortion, variable frequency drives having multiple rectifiers have been developed. Each rectifier in variable frequency drives having multiple rectifiers typically has six diodes. Variable frequency drives having two rectifiers are commonly called "twelve pulse variable frequency drives," variable frequency drives having three rectifiers are commonly called "eighteen pulse variable frequency drives," and so on. The multiple rectifiers in such variable frequency drives are configured to draw power across a transformer at different phases relative to one another. The multiple rectifiers cancel some harmonic frequencies and make the source current closer to sinusoidal than the current from a six pulse variable frequency drives having only one rectifier.

SUMMARY

A refrigerant loop according to an exemplary aspect of the present disclosure includes, among other things, a first group of variable frequency drives driving at least two compressors and configured to demand current at different phases relative to one another such that at least one current harmonic frequency at an alternating current power source is cancelled.

In a further non-limiting embodiment of the foregoing refrigerant loop, a first variable frequency drive drives a first compressor and is connected to a first compressor winding in a phase shift transformer, and a second variable frequency drive drives a second compressor and is connected to a second compressor winding in the phase shift transformer. The second compressor winding is at a 30° phase shift relative to the first compressor winding. The alternating current power source is connected to a source winding in the phase shift transformer.

In a further non-limiting embodiment of the foregoing refrigerant loop, the first variable frequency drive drives a first compressor and is connected to a first compressor winding in a phase shift transformer, and a second variable frequency drive drives a second compressor and is connected to a second compressor winding in the phase shift transformer being at a 20° phase shift relative to the first compressor winding, and a third variable frequency drive drives a third compressor and is connected to a third compressor winding in the phase shift transformer being at a 20° phase shift relative to the second compressor winding and a 40° phase shift relative to the first compressor winding. The alternating current power source is connected to a source winding in the phase shift transformer.

In a further non-limiting embodiment of the foregoing refrigerant loop, at least one variable frequency drive that receives power from the alternating current power source does not receive power across a phase shift transformer.

A further non-limiting embodiment of the foregoing refrigerant loop contains exactly two variable frequency drives.

In a further non-limiting embodiment of the foregoing refrigerant loop, a second group of variable frequency drives is powered by the alternating current power source. Variable frequency drives in the second group of variable frequency drives drive at least two compressors and are configured to demand current at different phases relative to one another such that at least one current harmonic frequency at the alternating current power source is cancelled.

In a further non-limiting embodiment of the foregoing refrigerant loop, the first group of variable frequency drives and the second group of variable frequency drives each contain exactly two variable frequency drives.

In a further non-limiting embodiment of the foregoing refrigerant loop, the first group of variable frequency drives and the second group of variable frequency drives each contain exactly three variable frequency drives.

In a further non-limiting embodiment of the foregoing refrigerant loop, the first group of variable frequency drives contains fewer variable frequency drives than the second group of variable frequency drives.

In a further non-limiting embodiment of the foregoing refrigerant loop, the first group of variable frequency drives contains exactly two variable frequency drives.

In a further non-limiting embodiment of the foregoing refrigerant loop, a total of five variable frequency drives demand current from the alternating current power supply.

An arrangement of variable frequency drives according to an exemplary aspect of the disclosure comprises a first variable frequency drive configured to receive power from an alternating current power source and a second variable frequency drive configured to receive power from the alternating current power source across a phase shift transformer at a phase shift relative to the first variable frequency drive. The phase shift cancels at least one current harmonic frequency at the alternating current power source. The first variable frequency drive does not receive power from the alternating current power source across the phase shift transformer.

In a further non-limiting embodiment of the foregoing arrangement, the phase shift of the second variable frequency drive relative to the first variable frequency drive is 30°.

In a further non-limiting embodiment of the foregoing arrangement, the phase shift of the second variable frequency drive relative to the first variable frequency drive is 20°. A third variable frequency drive is configured to receive power from the alternating current power source across the phase shift transformer at a phase shift relative to the first variable frequency drive of 20°, and at a phase shift relative to the second variable frequency drive of 40°.

In a further non-limiting embodiment of the foregoing arrangement, the variable frequency drives drive compressors in a refrigerant loop.

An arrangement of variable frequency drives according to another exemplary aspect of the disclosure comprises a first group of variable frequency drives configured to demand current across a first phase shift transformer at different phases relative to one another such that at least one current harmonic frequency at an alternating current power source is cancelled. A second group of variable frequency drives configured to demand current across a second phase shift transformer at different phases relative to one another such that at least one current harmonic frequency at the alternating current power source is cancelled. The second group of variable frequency drives contains more variable frequency drives than the first group of variable frequency drives.

In a further non-limiting embodiment of the foregoing arrangement, the variable frequency drives drive compressors in a refrigerant loop.

In a further non-limiting embodiment of the foregoing arrangement, the first group of variable frequency drives contains exactly two variable frequency drives.

In a further non-limiting embodiment of the foregoing arrangement, a total of five variable frequency drives demand current from an alternating current power supply.

In a further non-limiting embodiment of the foregoing arrangement, the first group of variable frequency drives demand current at a relative phase shift of 30° from each other. The second plurality of variable frequency drives contains exactly three variable frequency drives. The exactly three variable frequency drives comprise a first variable frequency drive, a second variable frequency drive configured to demand current at a 20° phase shift relative to the first variable frequency drive, and a third variable frequency drive configured to demand current at a 20° phase shift relative to the second variable frequency drive and at a 40° phase shift relative to the second variable frequency drive.

DETAILED DESCRIPTION

Figure 1:
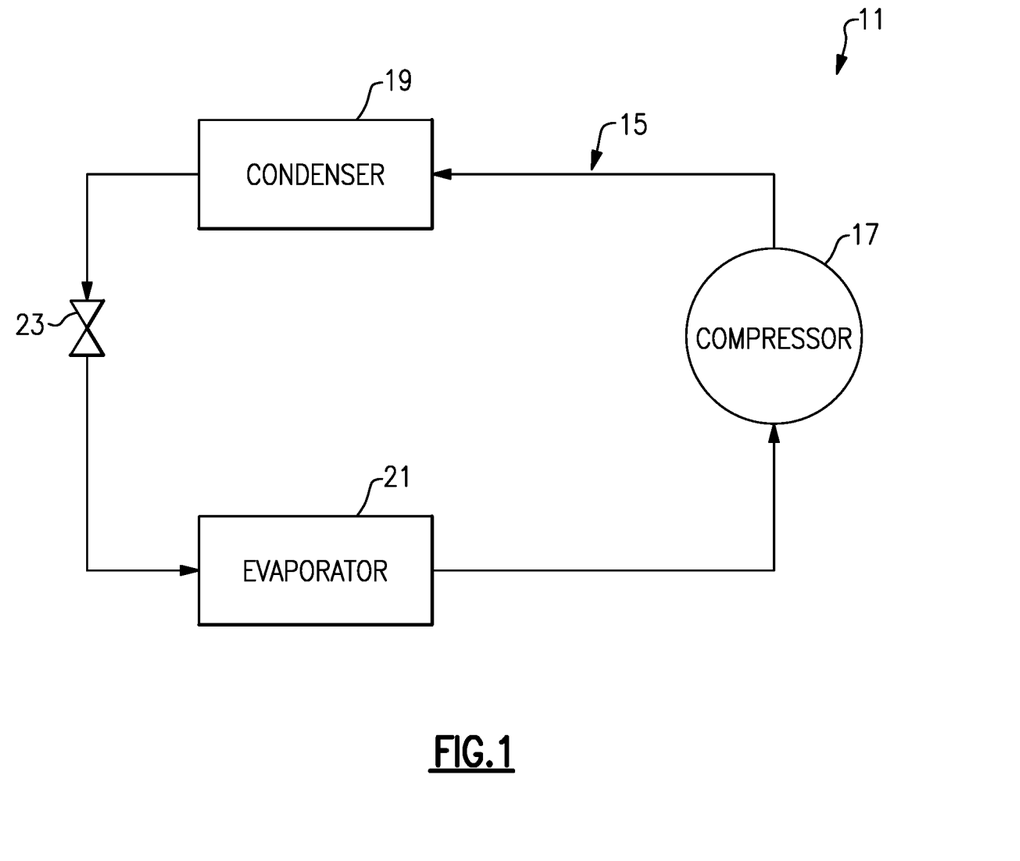
FIG. 1 is a schematic illustration of a refrigerant loop.

FIG. 1 illustrates a refrigerant cooling system 11. The refrigerant system 11 includes a main refrigerant loop, or circuit, 15 in communication with a compressor 17, a condenser 19, an evaporator 21, and an expansion device 23. This refrigerant system 11 may be used in a chiller, for example. Notably, while a particular example of the refrigerant system 11 is shown, this application extends to other refrigerant system configurations. For instance, the main refrigerant loop 15 can include an economizer downstream of the condenser 19 and upstream of the expansion device 23.

Compressors 17 frequently have motors connected to variable frequency drives. Individual chillers, refrigerant systems 11, or refrigerant loops may have multiple compressors. Further, multiple chillers, refrigerant systems 11, or refrigerant loops may be part of a single installation. Installations having multiple refrigerant systems 11 create a utility for cost efficient arrangements able to reduce harmonic distortion from multiple variable frequency drives in a single installation.

Figure 2:
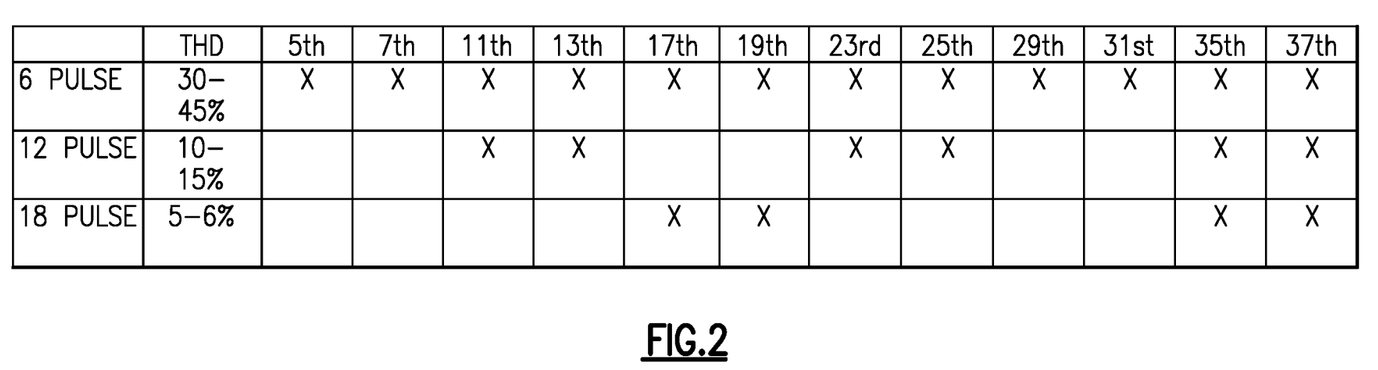
FIG. 2 is a table of harmonics produced by 6, 12, and 18 pulse variable frequency drives.
Figure 3A:
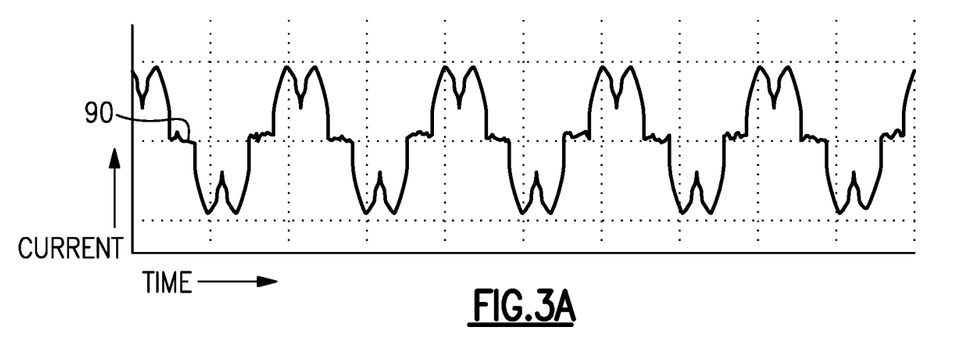
FIG. 3A is a graph of current waveform from a variable frequency drive application having one rectifier.

FIG. 2 is a table of harmonics in current present when powering a six pulse, twelve pulse, and eighteen pulse variable frequency drive. All harmonics are present when powering a six pulse, single rectifier variable frequency drive. Half are cancelled by a twelve pulse (two rectifier) variable frequency drive, and two thirds are cancelled by an eighteen pulse (three rectifier) variable frequency drive. The cancelling of harmonics leads to a reduction of total current harmonic distortion (THDI) as the quantity of rectifiers increases. This reduction is shown another way in FIGS. 3A, 3B, and 3C. Waveform 90 is the current demand from an application with a single rectifier, waveform 190 is the current demand from an application with two rectifiers, and waveform 290 is the current demand form an application with three rectifiers. As the number of rectifiers increases and the THDI decreases, the waveforms 90, 190, 290 trend closer toward having a pure sinusoidal shape.

Figure 3B:
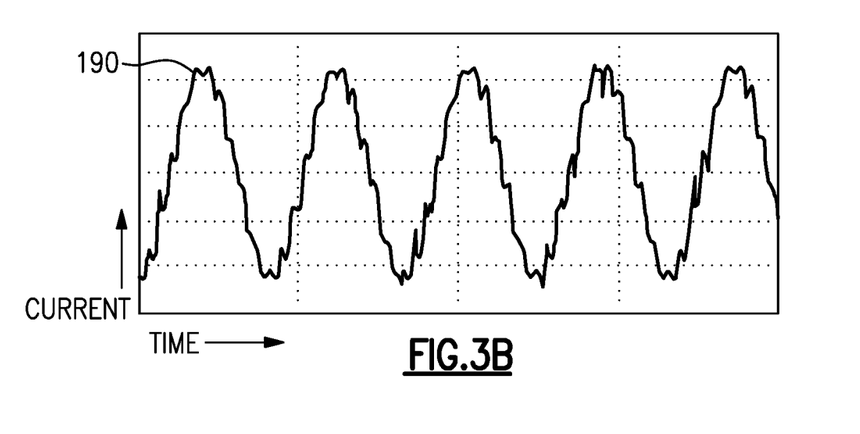
FIG. 3B is a graph of current waveform from a variable frequency drive application having two rectifiers.
Figure 3C:
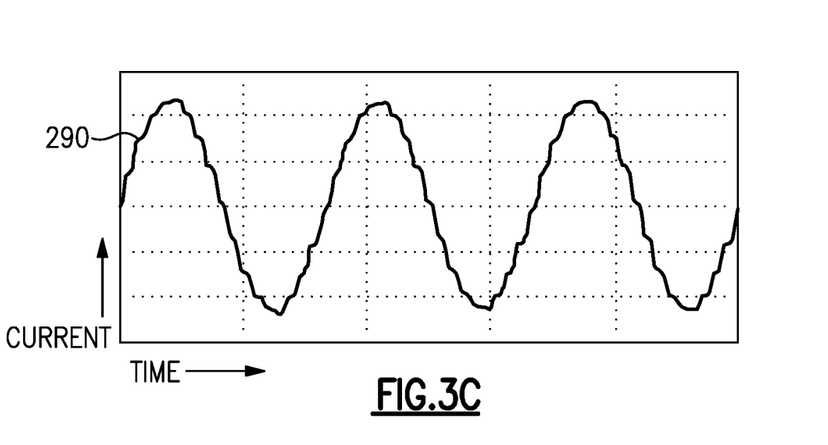
FIG. 3C is a graph of current waveform from a variable frequency drive application having three rectifiers.
Figure 4:
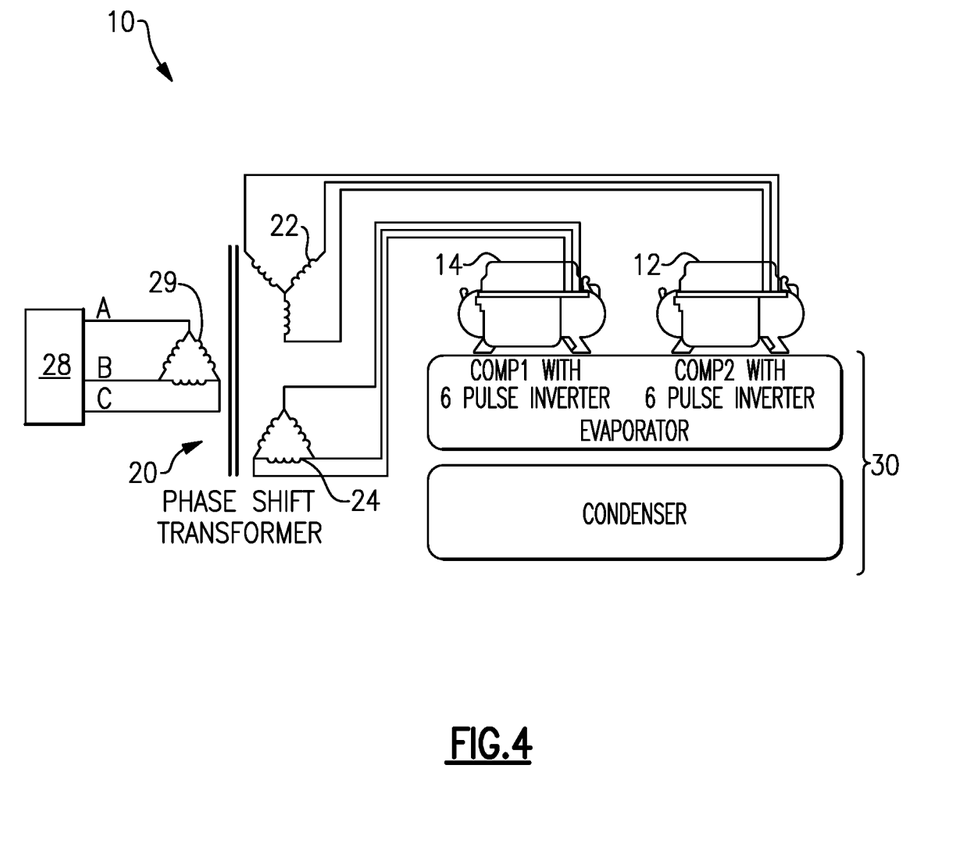
FIG. 4 is a schematic representation of a variable frequency drive application according to a first embodiment.

FIG. 4 schematically represents a variable frequency drive application 10 having a first compressor 12 and a second compressor 14. A transformer 20 is between the compressors 12, 14 and an alternating current power source 28. On the compressor side of the transformer 20 are a first compressor winding 22 and a second compressor winding 24 connected to the first compressor 12 and second compressor 14 respectively. The first compressor winding 22 and second compressor winding 24 are configured relative to one another and a source winding 29 such that the rectifier of the first compressor 12 will conduct current at a 30° phase shift from the second compressor 14. From a perspective of the source winding 29, there will be 12 pulses conducting per period of the source current, as shown in FIG. 3B. The first compressor 12 and second compressor 14 are used in a chiller 30.

Figure 5:
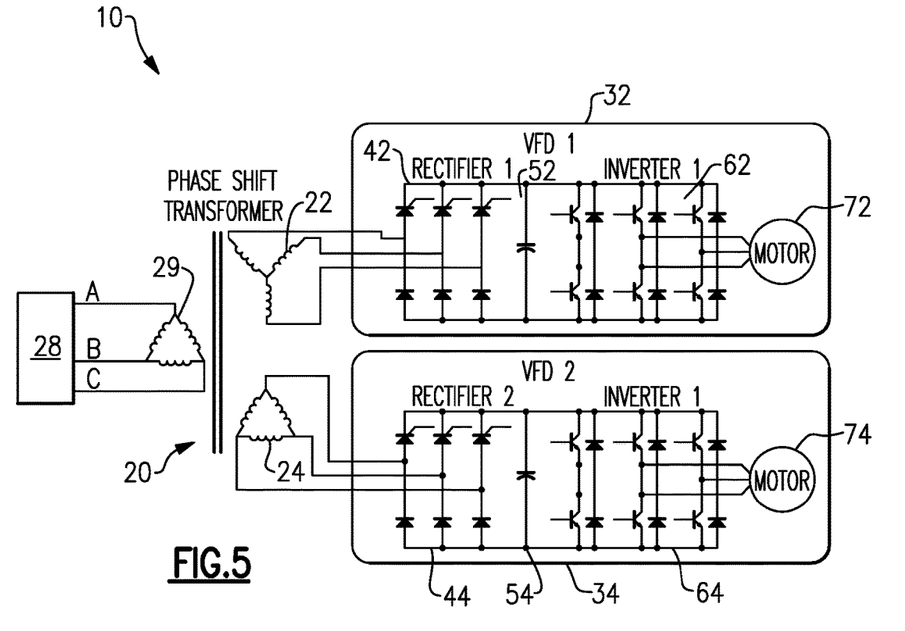
FIG. 5 is a circuit diagram of the variable frequency drive application according to the first embodiment.

FIG. 5 is a circuit diagram of a first variable frequency drive 32 and second variable frequency drive 34 in the application 10. The first variable frequency drive 32 has a first rectifier 42, a first bus 52, and a first inverter 62 for pulsing a first motor 72. Likewise, the second variable frequency drive 34 has a second rectifier 44, a second bus 54, and a second inverter 64 for pulsing a second motor 74.

Figure 6:
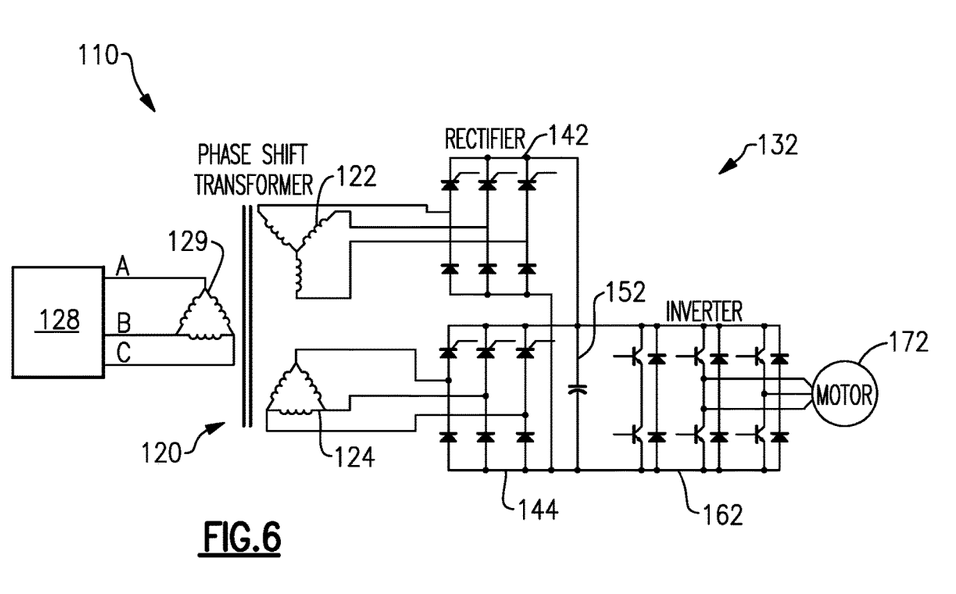
FIG. 6 is a circuit diagram of a known twelve pulse variable frequency drive.

FIG. 6 is a circuit diagram of a known twelve pulse variable frequency drive 132. The known twelve pulse variable frequency drive 132 receives power across a transformer 120 from an alternating current power source 128 connected to a source winding 129. A first secondary winding 122 and second secondary winding 124 are connected to a first rectifier 142 and second rectifier 144 respectively, and are configured to be 30° apart from one another. Both the first rectifier 142 and second rectifier 144 feed a single bus 152. The bus 152 is connected to an inverter 162 which pulses a motor 172.

As can be appreciated from FIGS. 5 and 6, the application 10 with a first six pulse variable frequency drive 32 and second six pulse variable frequency drive 34 will be equivalent to an application 110 with a single relatively expensive twelve pulse variable frequency drive 132 with respect to the total harmonic distortion created. The application 10 drives two compressors with one transformer and 12 diodes as rectifiers, but the twelve pulse variable frequency drive 132 of FIG. 6 only drives one compressor.

Figure 7:
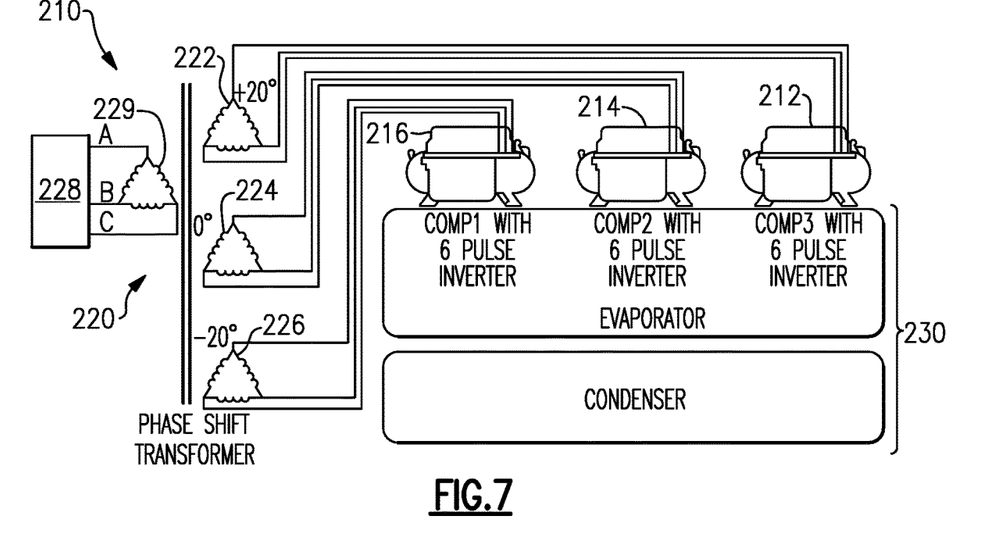
FIG. 7 is a schematic representation of a variable frequency drive application according to a second embodiment.

A variable frequency drive application 210 according to another embodiment is shown schematically in FIG. 7. The variable frequency drive application 210 has a first compressor 212, second compressor 214, and third compressor 216 receiving power across a transformer 220 from an alternating current power source 228 connected to a source winding 229. The compressors 212, 214, 216 are used in a chiller 230. The first compressor 212, second compressor 214, and third compressor 216 are connected to a first compressor winding 222, second compressor winding 224, and third compressor winding 226 respectively. The first compressor winding 222 and third compressor winding 226 are shifted by 20° in opposite directions from the second compressor winding 224. The first compressor winding 222 and third compressor winding 226 are a total of 40° apart from one another. The phase shifts between the first compressor winding 222, second compressor winding 224, and third compressor winding 226 result in an overall current demand resembling FIG. 3C. The application 210 with three compressors 212, 214, 216 achieves equivalent harmonic cancelling to an application with an eighteen pulse variable frequency drive according to the same principles by which the application 10 with two compressors 12, 14 achieves equivalent harmonic cancelling to the application 110 with a twelve pulse variable frequency drive 132. Because eighteen pulse variable frequency drives are even larger, more expensive, and less reliable than twelve pulse variable frequency drives, this application 210 can be a very efficient harmonic cancelling solution if six pulse variable frequency drives are used in the compressors 212, 214, 216.

Figure 8:
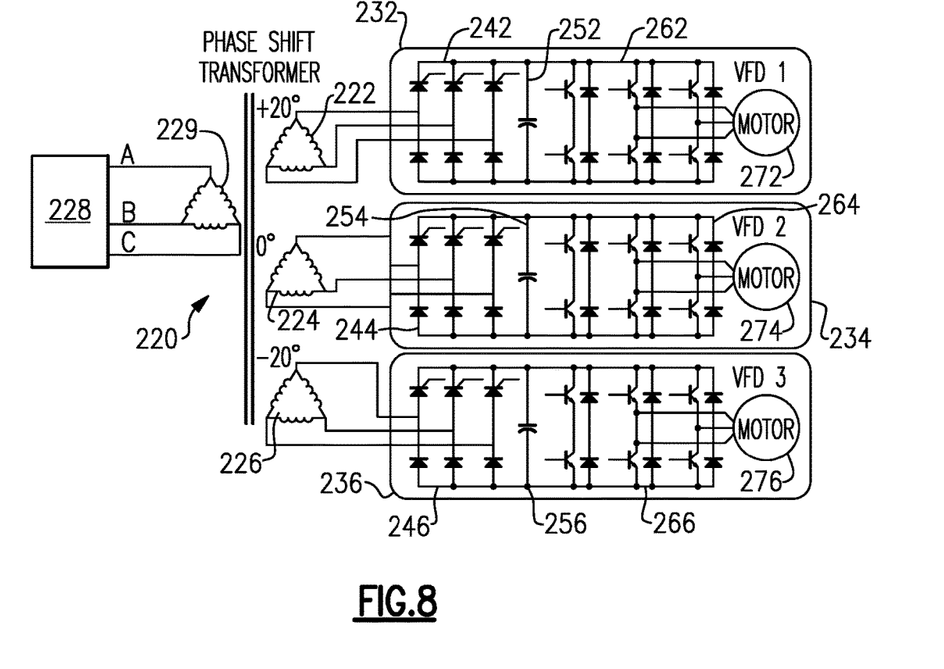
FIG. 8 is a circuit diagram of the variable frequency drive application according to the second embodiment.

FIG. 8 is a circuit diagram of a first variable frequency drive 232, second variable frequency drive 234, and third variable frequency drive 236 in the application 210 with three compressors 212, 214, 216. Each of the first, second, and third variable frequency drives 232, 234, 236 contains a respective first, second, or third rectifier 242, 244, 246, bus 252, 254, 256, and inverter 262, 264, 266 for pulsing a respective first, second, or third motor 272, 274, 276. Though only embodiments having up to three variable frequency drives 232, 234, 236 drawing power across a single transformer 220 are shown, it should be appreciated that a variable frequency drive application could have more than three variable frequency drives drawing power across a single transformer at appropriate relative phase shifts without departing from the scope of the invention.

Figure 9:
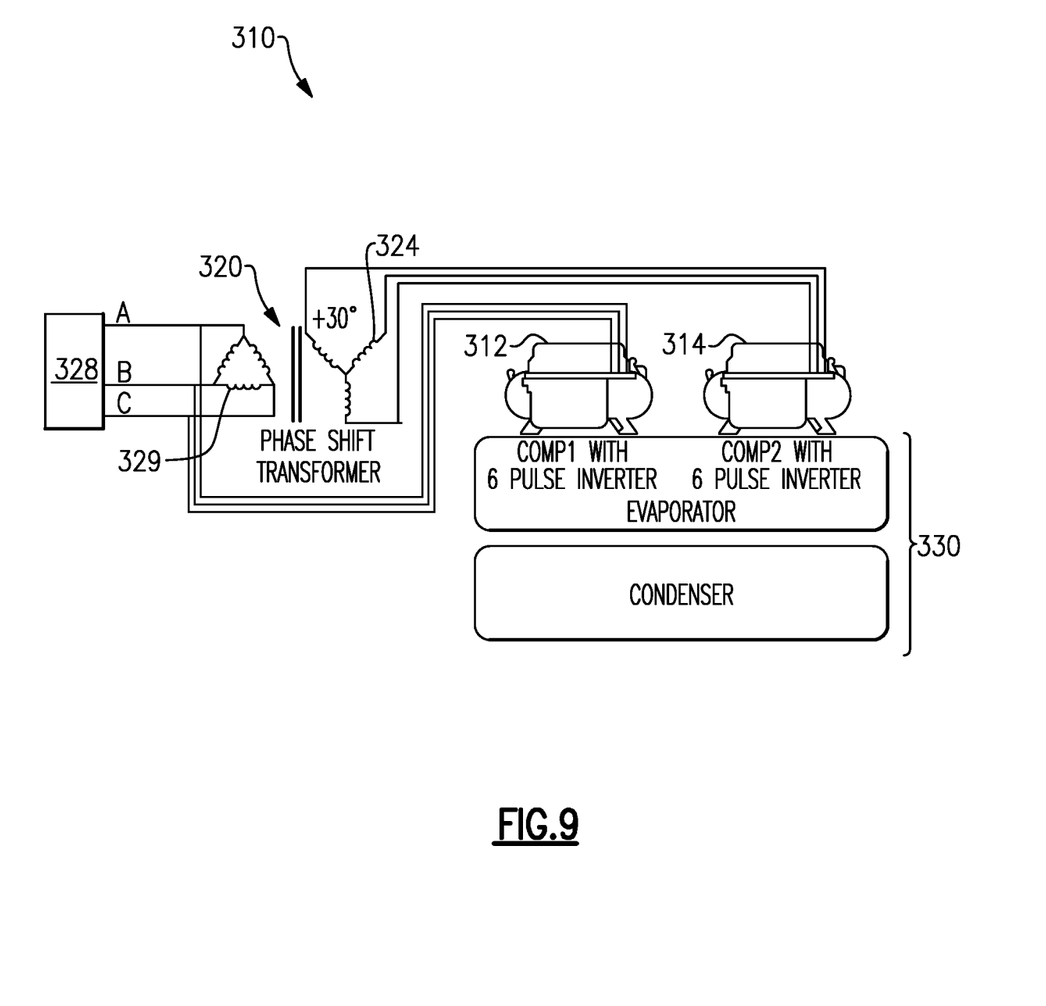
FIG. 9 is a schematic representation of a variable frequency drive application according to a third embodiment.

A variable frequency drive application 310 according to another embodiment is shown schematically in FIG. 9. The variable frequency drive application 310 includes a first compressor 312 and a second compressor 314 used in a chiller 330. The first compressor 312 is connected directly to an alternating current power source 328 and a primary winding 329 of a transformer 320. The second compressor 314 is connected to a secondary winding 324 which has a 30° phase shift from the primary winding 329. This application 310 is another way of achieving harmonic cancelling equal to the application 10 with two compressors 12, 14 receiving power across a transformer 20 shown in FIG. 4. Though the embodiment shown in FIG. 9 has the first compressor 312 connected directly to the alternating current power source 328 and only the second compressor 314 receiving power across the transformer 320 at a 30° phase shift, it should be appreciated that more compressors could receive power at appropriate phase shifts across the transformer 320 without departing from the scope of the disclosure. Compared to the transformer 20 of the application 10, the transformer 320 has fewer windings and is therefore less costly.

Figure 10A:
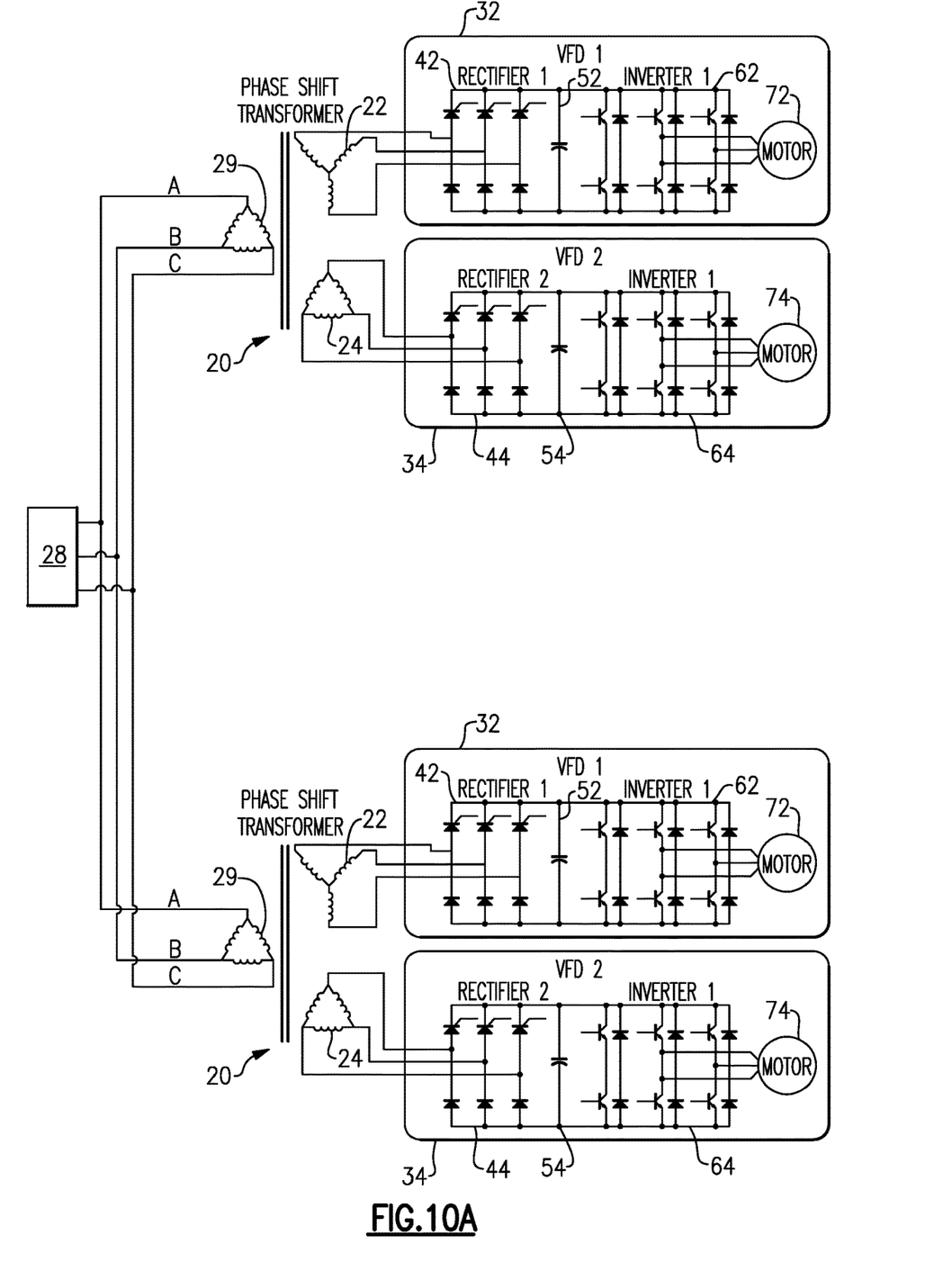
FIG. 10A is a circuit diagram of an application having four variable frequency drives.
Figure 10B:
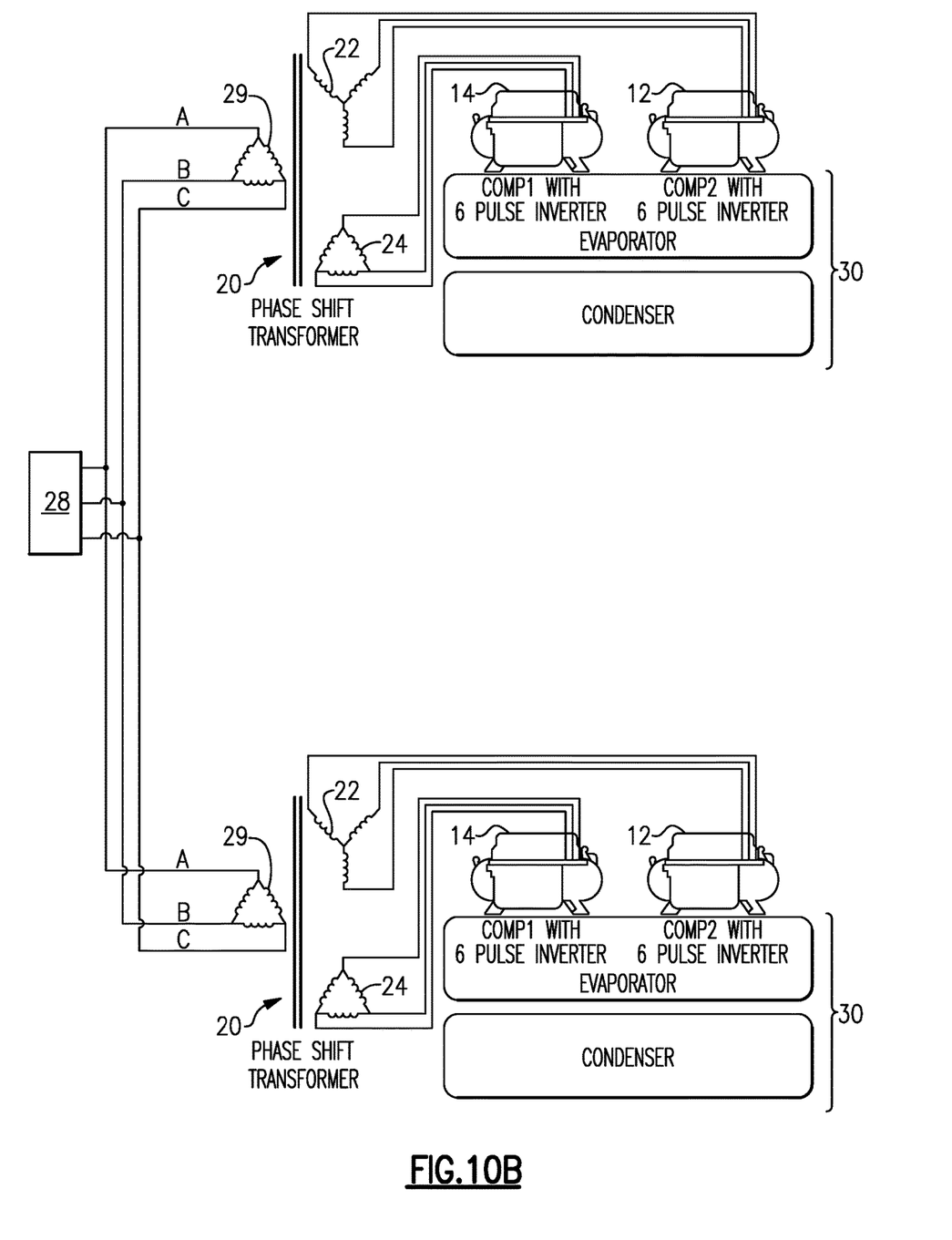
FIG. 10B is a schematic representation of the application having four variable frequency drives.
Figure 11A:
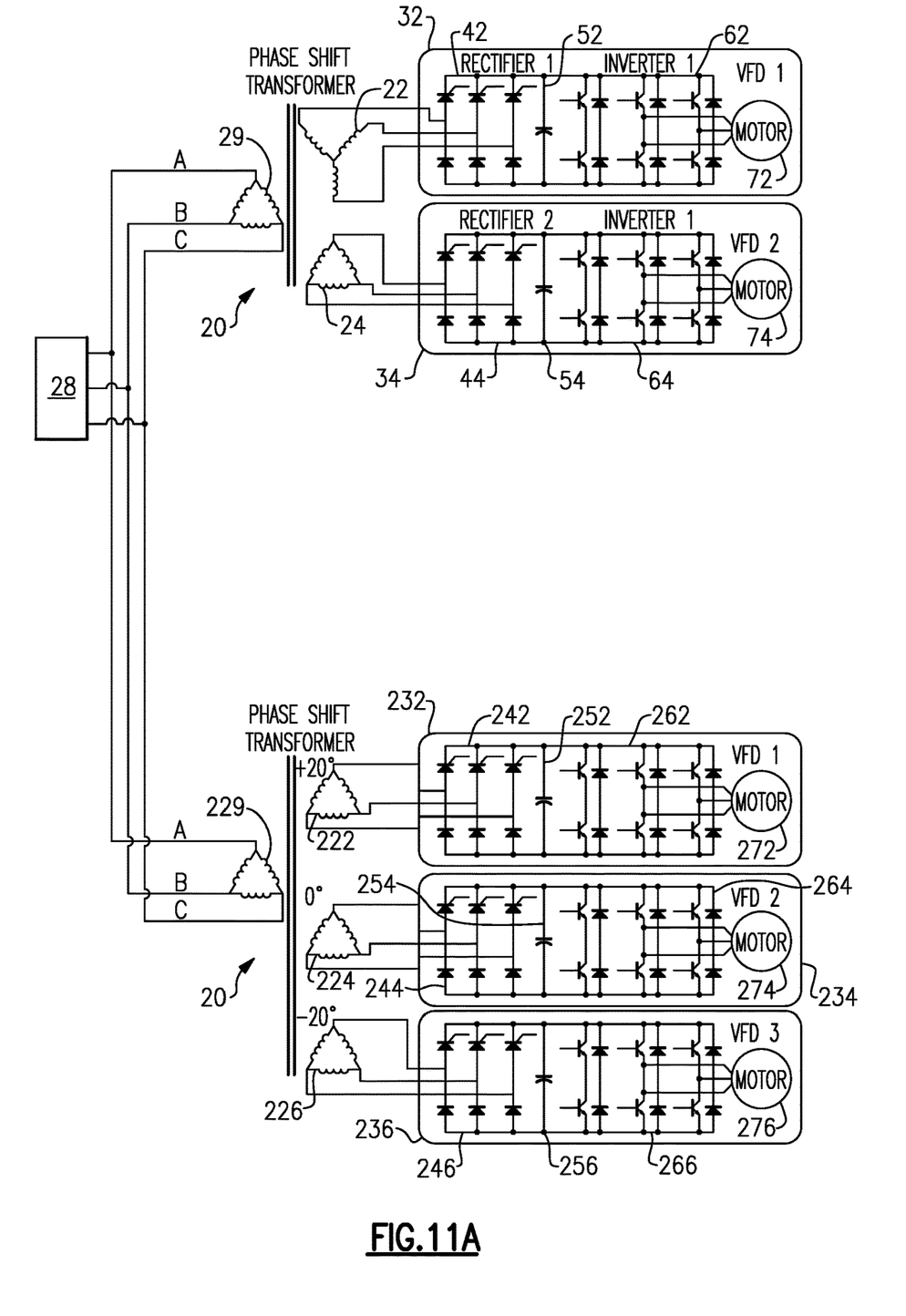
FIG. 11A is a circuit diagram of an application having five variable frequency drives.
Figure 11B:
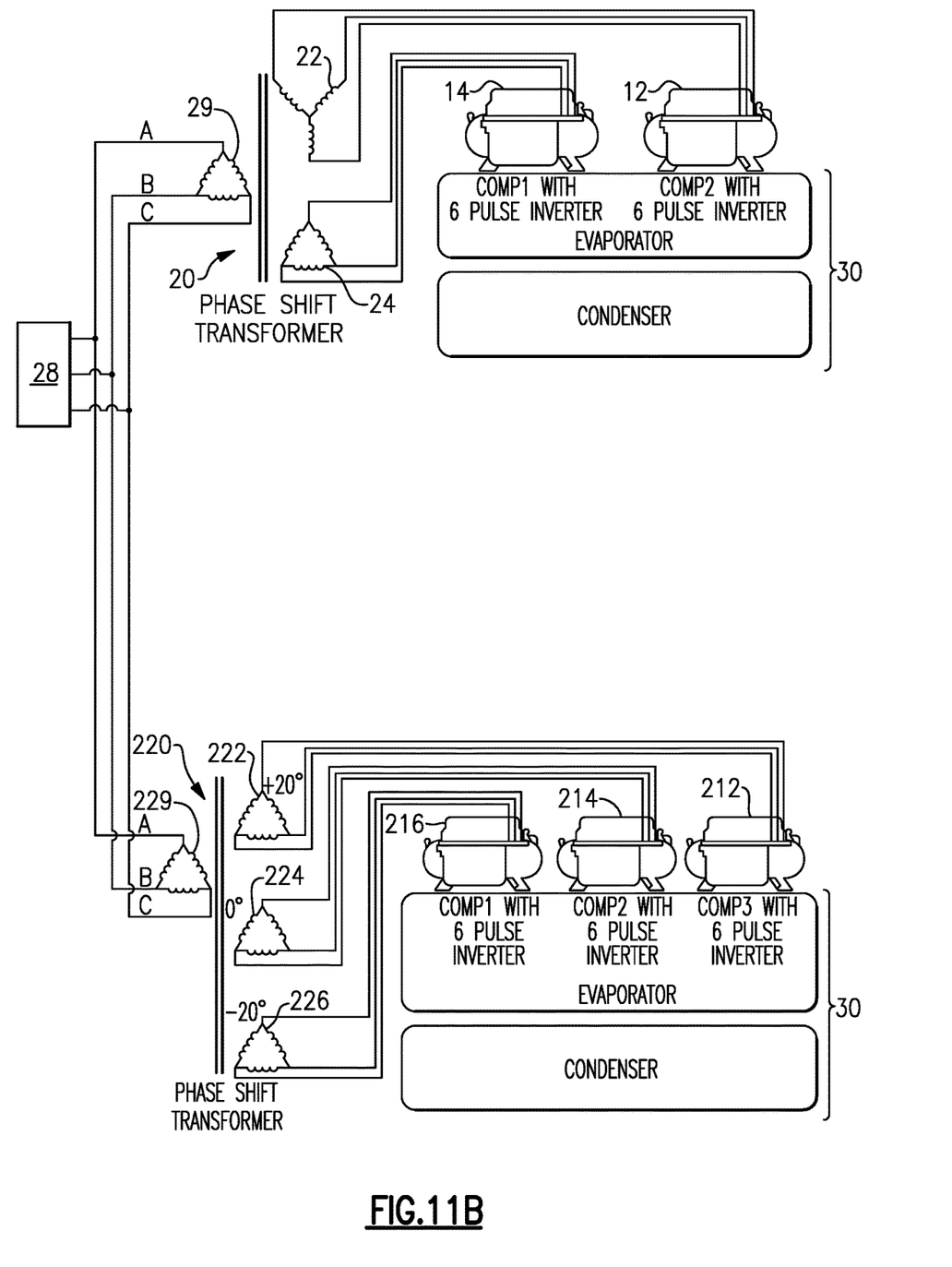
FIG. 11B is a schematic representation of the application having five variable frequency drives.
Figure 12A:
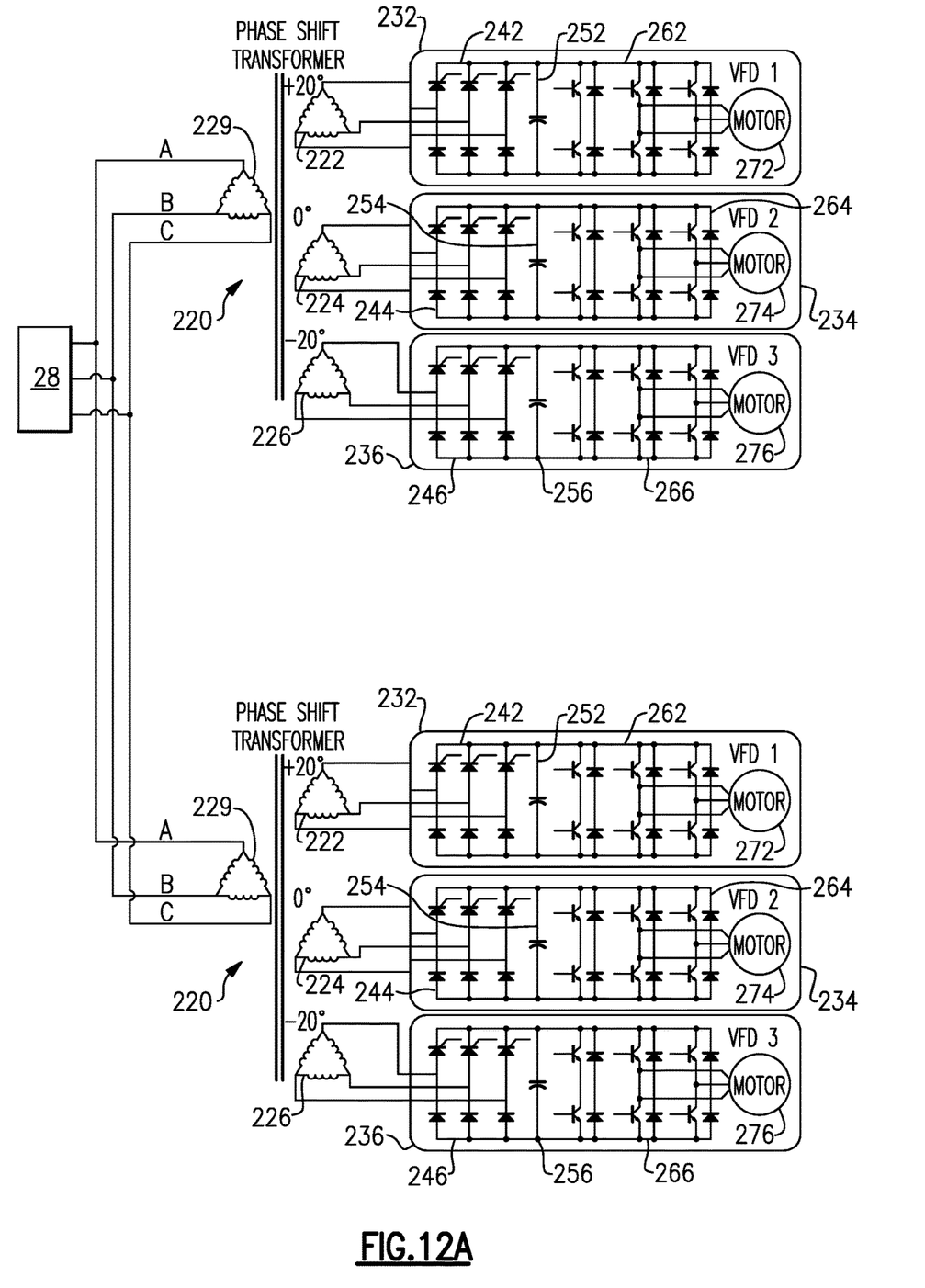
FIG. 12A is a circuit diagram of an application having six variable frequency drives.
Figure 12B:
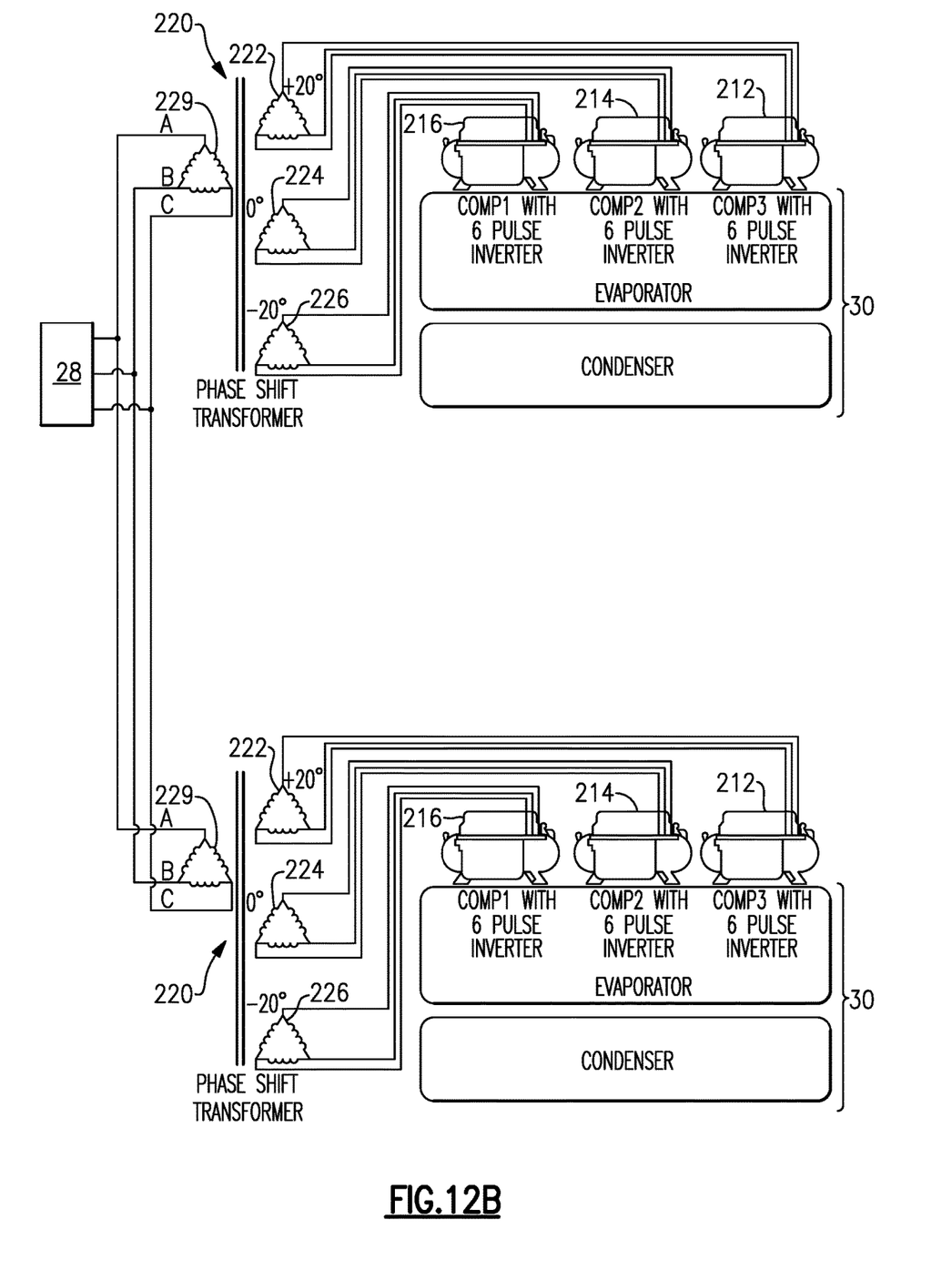
FIG. 12B is a schematic representation of the application having six variable frequency drives.

FIG. 10A is a circuit diagram for an application having four variable frequency drives 32, 34 constructed from two arrangements of two variable frequency drives 32, 34 each. The application shown in FIG. 10A has a relatively large output capacity while maintaining THDI reduction comparable to a single two drive arrangement 10. As shown schematically in FIG. 10B, this configuration of variable frequency drives 32, 34 may be used in one or more chillers 30. The approach of using multiple harmonic cancelling groups in a single application can be extrapolated according to the needs of the application. For example, FIG. 11A shows how an application having five variable frequency drives 32, 34, 232, 234, 236 can be achieved with an arrangement of two variable frequency drives 32, 34 implemented in conjunction with an arrangement of three variable frequency drives 232, 234, 236. The application having five variable frequency drives is schematically shown applied in chillers 30, 230 in FIG. 11B. FIG. 12A shows another example, with two arrangements of three variable frequency drives 232, 234, 236 used together in an application having a total of six variable frequency drives 232, 234, 236. As with the other configurations, a configuration with two arrangements of three variable frequency drives may be applied to chillers 230 as shown schematically in FIG. 12B. Applications having yet more variable frequency drives are contemplated. For example, an application could be constructed from more than two smaller arrangements. In another example, an application could contain smaller arrangements having more than three variable frequency drives drawing power across a single transformer.

As explained above, the applications 10, 210, 310 use multiple six pulse variable frequency drives to achieve harmonic cancelling comparable to individual variable frequency drives having multiple rectifiers. Harmonic cancelling is important for installations that call for multiple variable frequency drives because harmonic effects increase with the number of drives. As the number of rectifiers in an individual variable frequency drive increases, that variable frequency drive becomes larger and more expensive and provides less reliable performance. As such, installations that call for multiple variable frequency drives stand to realize significant benefits from arranging multiple six pulse variable frequency drives as described above instead of using variable frequency drives having multiple rectifiers.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A refrigerant loop, comprising:
a first plurality of six pulse variable frequency drives driving at least two compressors, wherein the plurality of six pulse variable frequency drives are configured to draw power across a single transformer, and wherein the plurality of six pulse variable frequency drives are configured to demand current at different phases relative to one another such that at least one current harmonic frequency at an alternating current power source is cancelled.

2. The refrigerant loop of claim 1, wherein:
the plurality of six pulse variable frequency drives includes a first six pulse variable frequency drive and a second six pulse variable frequency drive,
the first six pulse variable frequency drive drives a first compressor and is connected to a first compressor winding in a phase shift transformer;
the second six pulse variable frequency drive drives a second compressor and is connected to a second compressor winding in the phase shift transformer, the second compressor winding being at a 30° phase shift relative to the first compressor winding; and
the alternating current power source is connected to a source winding in the phase shift transformer.

3. The refrigerant loop of claim 1, wherein:
the plurality of six pulse variable frequency drives includes a first six pulse variable frequency drive, a second six pulse variable frequency drive, and a third six pulse variable frequency drive,
the first six pulse variable frequency drive drives a first compressor and is connected to a first compressor winding in a phase shift transformer;
the second six pulse variable frequency drive drives a second compressor and is connected to a second compressor winding in the phase shift transformer, the second compressor winding being at a 20° phase shift relative to the first compressor winding;
the third six pulse variable frequency drive drives a third compressor and is connected to a third compressor winding in the phase shift transformer, the third compressor winding being at a 20° phase shift relative to the second compressor winding and a 40° phase shift relative to the first compressor winding; and
the alternating current power source is connected to a source winding in the phase shift transformer.

4. An arrangement of variable frequency drives comprising:
a first six pulse variable frequency drive configured to receive power from an alternating current power source across a phase shift transformer;
a second six pulse variable frequency drive configured to receive power from the alternating current power source across the phase shift transformer at a phase shift relative to the first variable frequency drive, the phase shift cancelling at least one current harmonic frequency at the alternating current power source, wherein the phase shift of the second variable frequency drive relative to the first variable frequency drive is 20°; and
a third six pulse variable frequency drive configured to receive power from the alternating current power source across the phase shift transformer at a phase shift relative to the first six pulse variable frequency drive of 20°, and at a phase shift relative to the second six pulse variable frequency drive of 40°,
wherein the first, second, and third six pulse variable frequency drives drive first, second, and third compressors in a refrigerant loop,
wherein the phase shift transformer is a single transformer.

* * * * *